(12) United States Patent
Julien

(10) Patent No.: US 6,556,207 B1
(45) Date of Patent: Apr. 29, 2003

(54) GRAPHIC SCENE ANIMATION DATA SIGNAL WITH QUANTIZATION OBJECT, CORRESPONDING METHOD AND DEVICE

(75) Inventor: Signes M. Julien, Rennes (FR)

(73) Assignee: France Telecom and Telediffusion de Franc, Paris (FR)

( * ) Notice: Subject to any disclaimer, the term of this patent is extended or adjusted under 35 U.S.C. 154(b) by 0 days.

(21) Appl. No.: 09/462,309

(22) PCT Filed: Jul. 10, 1998

(86) PCT No.: PCT/FR98/01519

§ 371 (c)(1),
(2), (4) Date: Mar. 7, 2000

(87) PCT Pub. No.: WO99/03067

PCT Pub. Date: Jan. 21, 1999

(51) Int. Cl.[7] ............................................. G06T 11/00
(52) U.S. Cl. ...................................... 345/473; 345/428
(58) Field of Search ................................ 345/473, 582, 345/589, 419, 418, 428; 382/100, 107, 232, 154, 251

(56) References Cited

U.S. PATENT DOCUMENTS

| | | | | |
|---|---|---|---|---|
| 5,315,692 A | * | 5/1994 | Hansen et al. | 345/419 |
| 5,742,289 A | * | 4/1998 | Naylor et al. | 345/419 |
| 5,745,101 A | * | 4/1998 | Yamamoto et al. | 345/573 |
| 5,818,434 A | * | 10/1998 | Yamamoto et al. | 345/565 |

OTHER PUBLICATIONS

Rose, K. Et al.: "Entropy—Constrained Tree—Structured Vector Quantizer Design"; IEEE Transactions on Image Processing; vol. 5, No. 2; 1996; pp. 393–398; XP–000678941.

Koski, A.: "Primitive Coding Structural ECG Features"; Pattern Recognition Letters; vol. 17, No. 11, Sep. 16, 1996, pp. 1215–1222; XP–000639569.

Jasinschi, R. S. Et al.; "Video Compression Via Constructs"; Proceedings of the International Conference on Acoustics, Speech and Signal Processing (ICASSP), Detroit, May 9–12, 1995; Image and Multi—Dimensional Signal Porcessing/Signal Processing Applications Development, vol. 4, 1995; pp. 2165–2168; XP–000535384; Institute of Electrical and Electronics Engineers.

Interantional Search Report (PCT/ISA/220).

* cited by examiner

Primary Examiner—Mark Zimmerman
Assistant Examiner—Huedung X. Cao
(74) Attorney, Agent, or Firm—Merchant & Gould P.C.

(57) ABSTRACT

The invention relates to a data signal for animation of a graphic scene to be used by means for constructing images that can be displayed on at least one screen, a signal in which the scene is described in the form of a set of animation objects, each of which is associated with at least one characterization field defining a parameter of the object, comprising at least one quantization object, for which the characterization fields define the quantization rules for the characterization fields of the animation objects, each applicable to at least two distinct characterization fields, such that most or all of the characterization fields of the animation objects with a numeric value can be quantized. The invention also relates to the corresponding process and device.

28 Claims, 1 Drawing Sheet

Figure 1:
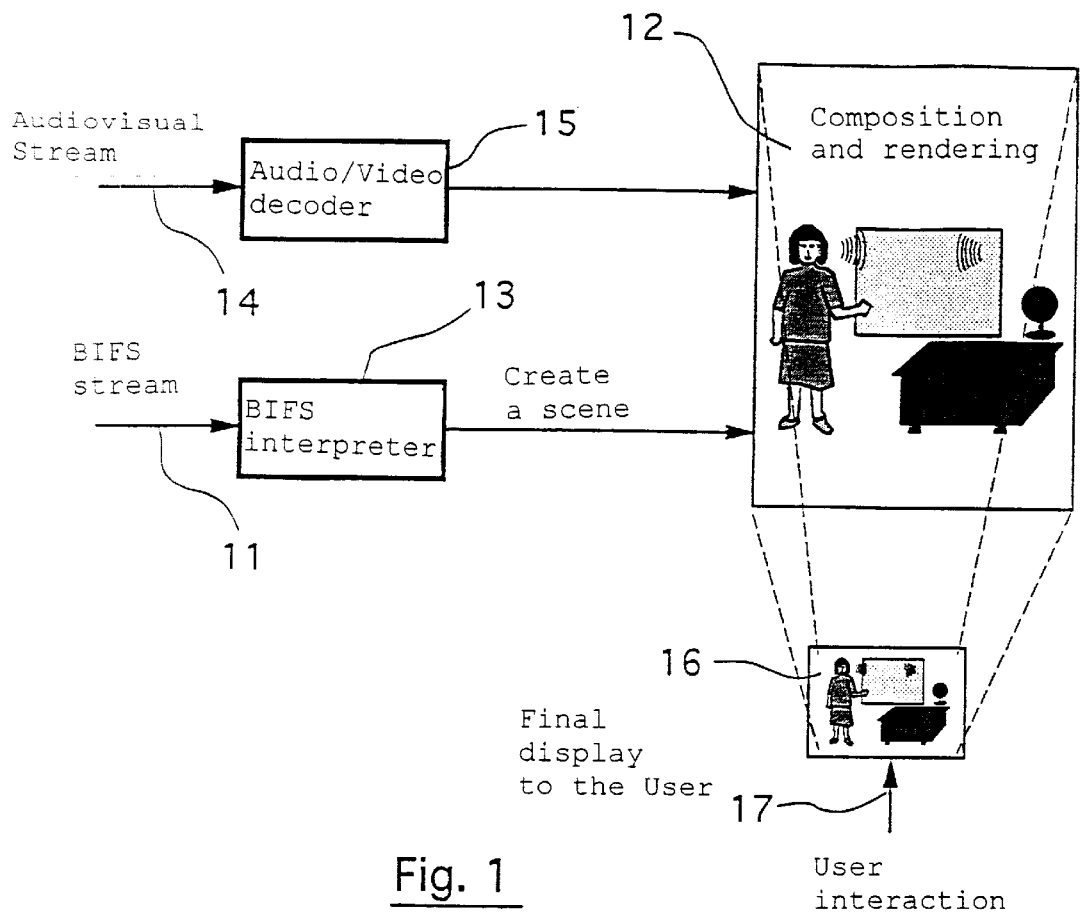

GRAPHIC SCENE ANIMATION DATA SIGNAL WITH QUANTIZATION OBJECT, CORRESPONDING METHOD AND DEVICE

The domain of the invention is coding of data representative of animated graphic scenes in order to reproduce them, for example on a multimedia terminal. More precisely the invention relates to the quantization of this type of data, so that they can be stored and/or transmitted.

For the purposes of this description, a graphic scene means the layout of graphic, video and image objects in time and in space. This type of graphic scene may be in two or three dimensions and may contain various types of graphic primitives.

The invention may be used in applications in all cases in which elements of a graphic scene have to be coded. In particular, it is applicable to scenes using the known VRLM and BIFS scene description formats developed in MPEG-4.

Standard ISO/IEC DIS 14772-1 describes the VRML 2.0 format. The MPEG-4 standardization group defined the scene description format called BIFS (Binary Format for Scene) which is based on VRML 2.0. The BIFS format is described particularly in "The MPEG-4 Systems Verification Model" (ISO/IEC JTC1/SC29/WG 11-N1693, MPEG 97, April 1997).

The purpose of this scene description format is to describe space/time relations between the various graphic objects in a scene. It does this by defining a number of nodes or objects representing all graphic primitives that are to be represented. Each of these nodes includes predefined fields that represent the characteristics of these nodes.

In other words, the BIFS format transmits a scene structure in the form of a parametric description, or a script.

BIFS type graphic scenes may be used for multimedia viewing (remote teaching, remote purchasing, remote work services), 3D games, advanced navigation interfaces in the services. In particular, the invention may be useful in the following applications viewing VRML 2.0 type graphic scenes on an "Internet" type network, in which a compact data display format has to be defined in order to reduce transmission times, the storage of this type of scene on media such as CD-Roms.

A binary scene display format already known for the VRML 2.0 standard is described in the document mentioned above. In order to quantize the parameters, the author proposes to send quantization parameters in the form of a node. However, the chosen quantization parameters are only applicable to a very limited number of fields. This has the effect of imposing the transmission of a large number of fields in an unquantized manner. Obviously, this limits the efficiency of the digital compression of data.

One particular purpose of the invention is that it overcomes these disadvantages in the state of the art.

More precisely, one purpose of the invention is to supply a data signal, and a process and device for using this signal, in order to significantly reduce the data necessary for coding and therefore the transmission and/or storage of animated graphic scenes, particularly in standards such as VRML and MPEG-4.

Another purpose of the invention is to provide a coding technique for data representative of graphic scenes that enable transmission of scenes at low throughput on a network, and reconstruction of these scenes in terminals that do not necessitate major hardware or software means.

Another purpose of the invention is to provide such a technique that will be efficient with any type of scene and any type of element forming part of this scene, without the need for specific (in other words in an unquantized manner) processing of some elements.

These purposes, and other purposes that will be described later, are achieved according to the invention by using a data signal for animation of a graphic scene to be used by means for constructing images that can be displayed on at least one screen, a signal in which the said scene is described in the form of a set of animation objects, each of which is associated with at least one characterization field defining a parameter of the said object, and comprising at least one quantization object, for which the characterization fields define the quantization rules for the characterization fields of the said animation objects, each applicable to at least two distinct characterization fields, such that most or all of the characterization fields of the said animation objects with a numeric value can be quantized.

Thus, a limited number of quantization types or rules can be defined to cover all possible cases.

Furthermore, it is proposed to transmit quantization parameters as an object or node. The advantage of transmitting these parameters as a node is to benefit from all functions related to transmission of nodes in a scene description stream:

declaration of a node in the scene is equivalent to declaring all its fields, with predefined default values;

declaration of any field is a means of redefining a value other than the default value of this field;

this node can be identified and then reused whenever necessary in the scene, simply by indicating its identifier.

Preferably, this type of quantization object includes at least one of the quantization rules belonging to the group comprising:

quantization rule for a three-dimensional position;

quantization rule for a two-dimensional position;

quantization rule for a color;

quantization rule for a texture;

quantization rule for an angle;

quantization rule for a scale change;

quantization rule for an animation key;

quantization rule for a normal.

Advantageously, each of the said quantization objects comprises a Boolean range field, indicating:

for a first value, that the quantization object is only applicable to the next object;

for the second value, that the quantization object is applicable to all subsequent objects, until a new quantization object is found.

The number of necessary data can thus be further limited.

According to one preferred embodiment, at least some of the items of information belonging to the group comprising the following may be produced for each rule for quantization of a parameter type:

a flag stating whether or not the quantization is to be used;

a minimum value (min) of the said parameter;

a maximum value (max) of the said parameter;

a number of bits (Nb) assigned to quantization of the said parameters.

The invention also relates to a coding process capable of producing this type of signal. This process comprises in particular:

a definition step, outputting at least one quantization object in which the characterization fields define rules for quantization of characterization fields of the said animation objects, each applicable to at least two distinct characterization fields, such that most or all of the characterization fields with a numeric value of the said animation object may be quantized; and a quantization step, quantizing data specific to each of the said characterization fields of the said animation objects as a function of the said quantization rules.

Finally, the invention also relates to a device for the construction of images that can receive this signal. In particular, it comprises:

means of reception of at least one quantization object, for which the characterization fields define the rules for quantization of the characterization fields of the said animation objects, each applicable to at least two distinct characterization fields, such that most or all characterization fields of the said animation objects with a numeric value may be quantized; and inverse quantization means for data specific to each of the said characterization fields of the said animation objects, as a function of the said quantization rules.

Figure 2:
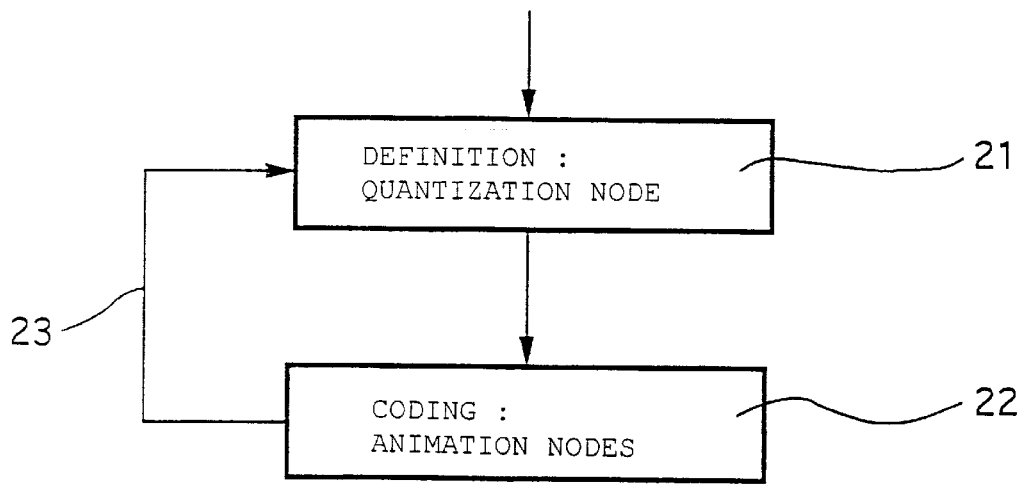

Other characteristics and advantages of the invention will become clearer after reading the following description of a preferred embodiment of the invention, given for illustrative purposes and in no way restrictive, and the attached drawings in which FIG. 1 diagrammatically illustrates a terminal that can make use of the signal according to the invention;

FIG. 2 shows the principle of construction of a signal according to the invention in a simplified manner.

As already mentioned, MPEG-4 defined a scene description format, the BIFS, inspired from the VRML 2.0 format. The purpose of this scene description format is to describe space-time relations between the graphic objects in a scene. The BIFS format does this by defining a number of "nodes" representing all graphic primitives to be transmitted. Each of these nodes has predefined fields that represent the characteristics of these nodes. For example, the Circle primitive has a floating point type of "radius" field. The "Video Object" primitive has the start and end times of this video as parameters.

The following description is applicable to MPEG-4. However, it may easily be adapted to the VRML language.

FIG. 1 shows an application example. Initially, the MPEG-4 terminal loads the graphic scene 11 described in a BIFS format. The scene is described in terms of objects or nodes. These nodes are represented by fields. These fields will be quantized using the quantization parameters sent in the new node described afterwards. The scene is then built up by the BIFS interpreter 13. The audiovisual stream 14 processed by the audiovideo decoder 15 is also used for the composition and rendering of the scene 12.

The result is thus an animated image 16 displayed to the user. If he wishes, he may take action (17) using an appropriate interface.

One difficulty in efficiently quantizing the fields of scene description nodes is that no statistics are available on these fields. Furthermore, many different fields are used with a highly variable frequency, and it would therefore be inefficient to need to individually transmit quantization parameters for each field.

Data to be quantized are grouped into eight main groups according to the invention:
1. 3D positions;
2. 2D positions;
3. the color;
4. texture coordinates;
5. angles;
6. scaling parameters;
7. animation keys;
8. normals.

These parameters are transmitted in the form of a quantization node. The coding principle is illustrated in FIG. 2.

The first step is to supply a definition (21) of quantization rules in the form of the quantization node, an example of which is given below.

Each animation node is then quantized (22) as a function of rules defined in the quantization node. Obviously, it is possible to redefine some or all parameters during the description, by delivering a new quantization node (23).

This type of quantization node may be written in BIFS as follows:

| | | | |
|---|---|---|---|
| QuantizationParameter{ | | | |
| Field | SFBool | isLocal | FALSE |
| Field | SFVec3f | position3DQuant | TRUE |
| Field | SFVec3f | position3Dmin | −_,−_,−_ |
| Field | SFVec3f | position3Dmax | +_,+_,+_ |
| Field | SFInt32 | position3DNbBits | 16 |
| Field | SFVec3f | position2DQuant | TRUE |
| Field | SFVec2f | position2Dmin | −_,−_,−_ |
| Field | SFVec2f | position2Dmax | +_,+_,+_ |
| Field | SFInt32 | position2DNbBits | 16 |
| Field | SFVec3f | colorQuant | TRUE |
| Field | SFFloat | ColorMin | 0.0 |
| Field | SFFloat | ColorMax | 1.0 |
| Field | SFInt32 | ColorNbBits | 8 |
| Field | SFVec3f | textureCoordinateQuant | TRUE |
| Field | SFFloat | textureCoordinateMin | 0.0 |
| Field | SFFloat | textureCoordinateMax | 1.0 |
| Field | SFInt32 | textureCoordinateNbBits | 16 |
| Field | SFVec3f | angleQuant | TRUE |
| Field | SFFloat | angleMin | 0.0 |
| Field | SFFloat | angleMax | 2_ |
| Field | SFInt32 | angleNbBits | 16 |
| Field | SFVec3f | scaleQuant | TRUE |
| Field | SFFloat | scaleMin | 0.0 |
| Field | SFFloat | scaleMax | +_ |
| Field | SFInt32 | scaleNbBits | 8 |
| Field | SFVec3f | keyQuant | TRUE |
| Field | SFFloat | keyMin | 0.0 |
| Field | SFFloat | keyMax | 1.0 |
| Field | SFInt32 | scaleNbBits | 8 |
| Field | SFVec3f | normalQuant | TRUE |
| Field | SFInt32 | normalNbBits | 8 |
| } | | | |

The "isLocal" field is a boolean that specifies the range of the quantization parameters. When it is set equal to "TRUE", the quantization parameters are only applicable to the next declared node. In this case, the quantization parameters used after this node are the parameters that were valid before the declaration of this parameter. If it is set equal to "FALSE", these quantization parameters are applicable to all nodes until a new quantization node is declared.

The following will be sent for each of the parameter groups mentioned above:

a boolean to define whether or not quantization will take place. If it is set equal to "TRUE" (default value), quantization parameters will be used for this value type. If it is set equal to "FALSE", this value type will be transmitted in the original field type without quantization;

the minimum value of the parameter. For 2D and 3D positions, this corresponds to vector values. In particular, this means that a surrounding box can be specified with varying coordinates. Scalar values are specified for other field types. The variation for only one of the coordinates is given for colors, scaling parameters and texture coordinates that are vector values;

the number of bits on which fields are transmitted is also specified.

Only the normals do not need the minimum and the maximum fields, since a normal can always be represented by an arbitrary vector over the entire unit sphere.

In other cases, the quantization may be done as follows:

Consider a value V to be quantized. Let Nb be the number of bits allocated, $V_{min}$ its minimum value, and $V_{max}$ its maximum value. Finally, let $V_q$ be its quantized value.

The following formula will be used during quantization:

$$V_q = \left[\frac{(v - v_{min})}{V_{max} - V_{min}} 2^{N_b}\right]$$

The following will be used for inverse quantization:

$$v = v_{min} + \frac{(v_{max} - v_{min})}{2^{N_b}} V_q$$

We will now describe the special case of some field types:
Positions and Colors

To improve the compression efficiency, colors and positions may use a vector quantization. In this case, the position and color parameters given in the QuantizationParameter node may be used to reset the surrounding box on which the vector quantization will be made, and that specified by quantization parameters. In particular, 3D lattice vector quantization will be particularly suitable for 3D colors and positions, whereas 2D lattice vector quantization is sufficient for 2D positions or textures.

Alternatively, any other quantization scheme may be used for these fields. For example, the three components of the resulting 3D or 2D vector may be quantized uniformly.
Normals and Axes of Rotation A scheme similar to that described in "MPEG 1996 proposal M1236, Geometry Compression", by Franck Bossen may be adopted for normals. This technique consists of breaking the unit sphere down into 8 octants, then breaking each octant down into 3 quadrilaterals, on which quantization can be done uniformly on a regular grid. Therefore the normalNbBits parameter indicates that the value of the normal will be represented on a regular square grid with 2normalNbBits elements along its side. Therefore, the normals will consequently be represented on normalNbBits+3+2 bits.

Alternatively, any other quantization scheme may be used for these fields. For example, the three components of the resulting 3D vector may be quantized uniformly.
SFRotation Type Fields In the VRML 2.0 standard and the BIFS format, SFRotation type fields are composed of four floating point numbers, the first three specifying an axis of rotation and the fourth an angle; for this field, it is proposed to apply quantization of normals for the axis of rotation, and quantization of angles for the fourth angle value.

As stated, the efficiency of the syntax used to represent the quantization node is particularly due to the fact that all its parameters may be applied.

In particular, the following parameters will be grouped:
0—3D positions:
These parameters affect all 3D positions, translation parameters in Transform nodes, and 3D distance parameters, size of 3D primitives (circle, cone, etc.). The parameters could be interpreted as follows for 3D distances:

$$d_{min} = 0.0$$

$$d_{max} = \sqrt{(x_{min} - x_{max})^2 + (y_{min} + y_{max})^2 + (Z_{min} + Z_{max})^2}$$

1—2D positions:
Same as for 2D.
2—Color:
All color, transparency or brightness, light parameters.
3—Texture coordinates:
Texture coordinate fields.
4—Angles:
Rotation, "crease" angle fields.
5—Scaling parameters:
Scaling parameters for "Transform" nodes.
6—Animation key parameters:
This quantizes key parameters for all "Interpolator" type nodes.
7—Normals:
This quantizes all parameters for "IndexedFaceSet" normals, and also all axes of rotation.

One advantage of declaring quantization parameters as nodes in the scene description language is that the same syntax can be used for the transmission of nodes. In particular, several quantization nodes may be used and some of these nodes may be reused appropriately in the scene.

The following example illustrates these possibilities:

Def Q1 QuantizationParameter
{
  colorIsOriginal TRUE
  is local TRUE
}
  DEF Q2 QuantizationParameter
  {
  position3Dmin −5−5−5
  position3Dmax 5 5 5
  position3DnbBits 8
  colorNbBits 6
}
Transform
{
  translation 10 10 10
  children [
  shape {
    geometry Cube { }
    appearance Appearance{
      DEF Mat material Material{
        emissiveColor 1 0 0
      }
    }
QuantizationParameter USE Q1
shape{
  geometry cone { }
  appearance Appearance{
    DEF Mat material Material{
      emissiveColor 0 1 0
    }
  }
shape{
  geometry sphere { }
  appearance Appearance{

```
            DEF Mat material Material{
                emissiveColor 0 0 1
            }
        }
    }
]
}
```
What is claimed is:

1. Data signal for animation of a graphic scene to be used by means for constructing images to be displayed on at least one screen, said scene being in the form of a set of animation objects, each of said objects being associated with at least one characterization field defining a parameter of said object, wherein said data signal comprises at least one quantization object, for which the characterization fields define quantization rules for the characterization fields of said animation objects, each applicable to at least two distinct characterization fields, such that most or all of characterization fields of animation objects having a numeric value can be quantized so as to reduce a quantity of data necessary for coding animation of said graphic scene.

2. Signal according to claim 1, wherein said quantization object comprises at least one quantization rule from the group consisting of;

quantization rule for a three-dimensional position;
quantization rule for a two-dimensional position;
quantization rule for a color;
quantization rule for a texture;
quantization rule for an angle;
quantization rule for a scale change;
quantization rule for an animation "key";
quantization rule for a normal.

3. Signal according to claim 1, wherein each of said quantization objects comprises a boolean range field, indicating:

for a first value, that the quantization object is only applicable to a next object;
for a second value, that the quantization object is applicable to all subsequent objects, until a new quantization object is found.

4. Signal according to claim 1, wherein at least some items of information from the group consisting of the following are produced for each rule for quantization of a parameter type:

a flag stating whether or not quantization is to be used;
a minimum value (min) of said parameter;
a maximum value (max) of said parameter;
a number of bits (Nb) assigned to quantization of said parameters.

5. Process for coding animation data for a graphic scene, to be used by image construction means that may be displayed on at least one screen, said scene being in the form of a set of animation objects, each of said objects being associated with at least one characterization field defining a parameter of said object, comprising the steps of:

a definition step, outputting at least one quantization object in which the characterization fields define rules for quantization of the characterization fields of said animation objects, each rule being applicable to at least two distinct characterization fields, such that most or all characterization fields having a numeric value of said animation objects may be quantized; and a quantization step, quantizing data specific to each of said characterization fields of the animation objects as a function of said quantization rules.

6. Device for construction of images that can be displayed on at least one screen, said images being in the form of a set of animation objects, each of said objects being associated with at least one characterization field defining a parameter of said object, said device comprising:

means of reception of at least one quantization object, for which the characterization fields define rules for quantization of the characterization fields of said animation objects, each rule being applicable to at least two distinct characterization fields, such that most characterization fields of animation objects having a numeric value may be quantized; and inverse quantization means for data specific to each of said characterization fields of said animation objects, as a function of said quantization rules.

7. Signal according to claim 1, transmitted to at least one terminal on a network, a quantity of data necessary for transmitting said graphic scene being reduced.

8. Signal according to claim 1, stored on a multimedia terminal readable medium, a quantity of data necessary for storing said graphic scene being reduced.

9. A multimedia terminal having a signal therein for animation of a graphic scene to be used by means for constructing images that can be displayed on at least one screen, said signal being in the form of a set of animation objects, each of said objects being associated with at least one characterization field defining a parameter of said object, wherein said data signal comprises at least one quantization object, for which the characterization fields define quantization rules for the characterization fields of said animation objects, each applicable to at least two distinct characterization fields, such that most or all of characterization fields of animation objects having a numeric value can be quantized.

10. Multimedia terminal according to claim 9, wherein said quantization object comprises at least one quantization rule from the group consisting of:

quantization rule for a three-dimensional position;
quantization rule for a two-dimensional position;
quantization rule for a color;
quantization rule for a texture;
quantization rule for an angle;
quantization rule for a scale change;
quantization rule for an animation "key";
quantization rule for a normal.

11. Multimedia terminal according to claim 9, wherein each of said quantization objects comprises a boolean range field, indicating:

for a first value, that the quantization object is only applicable to a next object;
for a second value, that the quantization object is applicable to all subsequent objects, until a new quantization object is found.

12. Multimedia terminal according to claim 9, wherein at least some items of information from the group consisting of the following are produced for each rule for quantization of a parameter type:

a flag stating whether or not quantization is to be used;
a minimum value (min) of said parameter;
a maximum value (max) of said parameter,
a number of bits (Nb) assigned to quantization of said parameters.

13. Multimedia terminal according to claim 9, wherein quantizing most or all of the characterization fields of said animation object having a numeric value reduces a quantity of data necessary for coding said scene.

14. Multimedia terminal according to claim 9, wherein quantizing most or all of the characterization fields of said animation object having a numeric value reduces a quantity of data that must be transmitted to said multimedia terminal so as to transmit said scene.

15. Multimedia terminal according to claim 9, wherein quantizing most or all of the characterization fields of said animation object having a numeric value reduces a quantity of data that must be stored on storage means to store said scene.

16. Multimedia terminal according to claim 9, wherein quantizing most or all of the characterization fields of said animation object having a numeric value enables transmission of said scene at low throughput through a network.

17. Multimedia terminal according to claim 9, wherein quantizing most or all of the characterization fields of said animation object having a numeric value enables reconstruction of said scene without additional hardware or software means.

18. A multimedia terminal readable medium comprising at least one signal stored thereon for animation of a graphic scene to be used by means for constructing images that can be displayed on at least one screen, said signal in which said scene being in the form of a set of animation objects, each of said objects being associated with at least one characterization field defining a parameter of said object, wherein said data signal comprises at least one quantization object, for which the characterization fields define quantization rules for the characterization fields of said animation objects, each applicable to at least two distinct characterization fields, such that most or all of characterization fields of animation objects having a numeric value can be quantized.

19. Multimedia terminal readable medium according to claim 18, wherein said quantization object comprises at least one quantization rule from the group consisting of:

quantization rule for a three-dimensional position;
quantization mile for a two-dimensional position;
quantization rule for a color;
quantization rule for a texture;
quantization rule for an angle;
quantization rule for a scale change;
quantization rule for an animation "key";
quantization rule for a normal.

20. Multimedia terminal readable medium according to claim 18, wherein each of said quantization objects comprises a boolean range field, indicating:

for a first value, that the quantization object is only applicable to a next object;
for a second value, that the quantization object is applicable to all subsequent objects, until a new quantization object is found.

21. Multimedia terminal readable medium according to claim 18, wherein at least some items of information from the group consisting of the following are produced for each rule for quantization of a parameter type:

a flag stating whether or not quantization is to be used;
a minimum value (min) of said parameter;
a maximum value (max) of said parameter;
a number of bits (Nb) assigned to quantization of said parameters.

22. Method for generating a data signal in a multimedia terminal comprising the steps of:

forming a signal in the form of a set of animation objects, each of said objects being associated with at least one characterization field defining a parameter of said object, wherein said data signal comprises at least one quantization object, for which the characterization fields define quantization rules for the characterization fields of said animation objects, each applicable to at least two distinct characterization fields, such that most or all of characterization fields of animation objects having a numeric value can be quantized.

23. Method according to claim 22, wherein said quantization object comprises at least one quantization rule from the group consisting of:

quantization rule for a three-dimensional position;
quantization rule for a two-dimensional position;
quantization rule for a color;
quantization rule for a texture;
quantization rule for an angle;
quantization rule for a scale change;
quantization rule for an animation "key";
quantization rule for a normal.

24. Method according to claim 22, wherein each of said quantization objects comprises a boolean range field, indicating:

for a first value, that the quantization object is only applicable to a next object;
for a second value, that the quantization object is applicable to all subsequent objects, until a new quantization object is found.

25. Method according to claim 22, wherein at least some items of information from the group consisting of the following are produced for each rule for quantization of a parameter type:

a flag stating whether or not quantization is to be used;
a minimum value (min) of said parameter;
a maximum value (max) of said parameter;
a number of bits (Nb) assigned to quantization of said parameters.

26. Method for transmitting a data signal to a multimedia terminal, comprising the steps of:

forming a signal in the form of a set of animation objects, each of said objects being associated with at least one characterization field defining a parameter of said object; and transmitting said data signal to a multimedia terminal;

wherein said data signal comprises at least one quantization object, for which the characterization fields define quantization rules for the characterization fields of said animation objects, each applicable to at least two distinct characterization fields, such that most or all of characterization fields of animation objects having a numeric value can be quantized.

27. Method for receiving a data signal in a multimedia terminal, comprising the steps of:

receiving a signal in the form of a set of animation objects, each of said objects being associated with at least one characterization field defining a parameter of said object; and processing said data signal in a multimedia terminal;

wherein said data signal comprises at least one quantization object, for which the characterization fields define quantization rules for the characterization fields of said animation objects, each applicable to at least two distinct characterization fields, such that most or all of characterization fields of animation objects having a numeric value can be quantized.

28. Data signal for transmission to at least one terminal for animation of a graphic scene therein, said data signal being in the form of a set of animation objects, each of said objects being associated with at least one characterization field defining a parameter of said object;

wherein said data signal comprises at least one quantization object, for which the characterization fields define quantization rules for the characterization fields of said animation objects, each applicable to at least two distinct characterization fields, such that most or all of characterization fields of animation objects having a numeric value can be quantized, so as to reduce a quantity of data necessary for coding animation of said graphic scene.

* * * * *